United States Patent [19]

Lurie

[11] 4,376,303
[45] Mar. 8, 1983

[54] QUASI-ZOOM LENS OPTICAL FOCUS SENSOR

[75] Inventor: Michael J. Lurie, East Brunswick, N.J.

[73] Assignee: RCA Corporation, New York, N.Y.

[21] Appl. No.: 218,073

[22] Filed: Dec. 19, 1980

[51] Int. Cl.³ .................................................. G11B 7/12
[52] U.S. Cl. ...................................... 369/45; 369/46; 369/112; 250/201; 350/423
[58] Field of Search ................. 369/45, 46, 111, 112, 369/120; 358/128.5; 250/201, 208, 209, 570, 578; 350/423, 481

[56] References Cited

U.S. PATENT DOCUMENTS

| | | | |
|---|---|---|---|
| 3,842,194 | 10/1974 | Clemens | 178/6.6 A |
| 3,876,841 | 4/1975 | Kramer | 179/100.3 V |
| 3,911,209 | 10/1975 | Bouwhuis | 369/45 |
| 3,969,575 | 7/1976 | Gerritsen | 369/45 |
| 3,992,575 | 11/1976 | Velzel | 178/6.6 R |
| 3,997,715 | 12/1976 | Elliott | 178/6.6 DD |
| 4,044,379 | 8/1977 | Halter | 358/128 |
| 4,065,786 | 12/1977 | Stewart | 358/128 |
| 4,074,314 | 2/1978 | Velzel | 369/45 |
| 4,085,423 | 4/1978 | Tsunoda | 369/45 |
| 4,100,404 | 7/1978 | Johnson | 350/423 |
| 4,100,577 | 7/1978 | Naruse | 358/128 |
| 4,118,736 | 10/1978 | Okada | 358/128 |
| 4,150,399 | 4/1979 | Boonstra | 358/128 |
| 4,152,586 | 5/1979 | Elliott | 369/112 |
| 4,183,060 | 1/1980 | Barnette | 358/128 |

OTHER PUBLICATIONS

U.S. Patent App. Ser. No. 218,100, Jebens; 12/9/80; Optical Focus Sensor.

*Primary Examiner*—Alan Faber
*Attorney, Agent, or Firm*—E. M. Whitacre; J. S. Tripoli; J. E. Roehling

[57] ABSTRACT

Recovery from a record of data recorded in an elongated information track, comprising depressed areas of a given width, a given depth and variable length, alternating along the length of the track with relatively non-depressed areas, is effected by an optical playback system. The playback system employs means for focusing light from a laser source on the information track as a light spot having a diameter which is diffraction limited. The focusing system includes an additional light source (e.g., laser) which impinges on the surface of the record as a circular spot which illuminates a plurality of elongated tracks. The circular spot is imaged by a lens system on a detector plane which is positioned at a plane which is conjugate to the record surface. The focus error signal which is used to adjust the position of the objective lens with respect to the record surface is representative of a measure of the diameter of the circular spot imaged on the detector plane, and, thus, is a measure of the diameter of the circular spot at the record surface. The imaging lens system includes a quasi-zoom lens arrangement that permits adjustment of the correct focus when the surface of the record is at the required position.

5 Claims, 3 Drawing Figures

QUASI-ZOOM LENS OPTICAL FOCUS SENSOR

This invention relates to an apparatus for reading or recording information, for example, video and/or audio information, on a flat, record medium and, more particularly, to a focusing system for use in such recording apparatus for positioning a focusing lens to maintain a radiant beam accurately focused on a moving surface of the record medium.

In an optical video disc player a disc is rotated on a turntable while a light beam scans an information surface of the disc. A focusing lens forms the light beam to a diffraction limited spot on the information surface. Light modulated by the information recorded on the disc surface is reflected back through the focusing lens and directed onto a photodetector that provides a video output. In order to read out the information recorded at high densities on the disc surface, the light beam must be accurately focused on the video disc surface so that the light spot covers only a very small area, as mentioned above. In the most advantageous arrangement the size of the light spot is diffraction limited. In a video disc player the surface to be read may not be perfectly flat with respect to a fixed point as the disc rotates—if the disc is rotated on a turntable, eccentricities in the disc, in the turntable or in the rotating drive mechanism may displace the surface of the disc. In general, the focusing lens is provided to focus a light beam precisely on the video disc surface so as to form a beam spot of the desired size. These eccentricities, however, change the distance between the focusing lens and the surface of the disc, thereby defocusing the impinging light beam. Variations in the spacing between the focusing lens and the disc surface can be compensated for by moving the focusing lens toward and away from the disc surface to reposition the focus spot, but this requires apparatus for sensing the amount and direction of shifting of the video disc surface.

One optical focus sensor arrangement which is used to maintain constant the distance between the focusing lens and the disc surface is described in an application of Robert W. Jebens Ser. No. 218,100 filed on Dec. 19, 1980, concurrently herewith. In that sensor arrangement correct focus is indicated when an enlarged circular image of a spot of light on the disc surface has a particular diameter at a remote image plane. In the Jebens' system an in-focus condition is indicated when the combined output from four photodetectors located at the image plane is a null. To adjust for an in-focus condition the four photodetectors must be positioned and the magnification of the enlarged circular image must be adjusted iteratively to null the output when an in-focus condition exists. Positioning the photodetectors and adjusting the magnification at the remote image plane can be a difficult operation requiring several hours of set up.

Further, in the Jebens system the length of the apparatus from the remote image plane to the imaging lens is long in order to obtain the proper magnification. This lengthens the system and reduces structural rigidity.

In accordance with the principles of the present invention, a quasi-zoom lens arrangement is provided to image the enlarged circular image at the remote image plane. This quasi-zoom arrangement permits magnification adjustment of the imaging system to provide a null signal output when an in-focus condition exists, thus eliminating the tedious, time-consuming iterative process of both moving the detectors and adjusting the magnification. The adjustment requires only a single mechanical movement (i.e., one lens). Further, the length of the imaging system (i.e., the distance from the remote image plane to the imaging lens) may be reduced substantially, thus improving the structural rigidity of the optics system.

There are other advantages of this quasi-zoom arrangement. The lens may be moved several millimeters to achieve focus correction of a fraction of a micrometer. Since the image size may be adjusted instead of the detector size a complex mechanical arrangement for holding the detectors is not needed. Since only the imaging system, not the illuminating system, is changed, sensor parameters which are dependent upon illumination remain constant. The optical and mechanical complexity of a true zoom lens is eliminated thus reducing the cost and improving performance (i.e., fewer optical surfaces).

Further, in accordance with the principles of the present invention an apparatus for use in playback of a record medium having information stored along successive elongated tracks on a flat reflective surface of the record medium is provided. The apparatus which controls a focusing lens to maintain a read beam in-focus on the flat reflective surface of the record medium comprises a first light source emitting a light beam of a given wavelength. First means are provided for projecting the light beam emitted by the first light source to impinge on the reflective surface of the record medium as a circular spot having a diameter sufficiently large to span a plurality of the elongated tracks. The circular spot is imaged by lens means to a conjugate circular image at a plane remote from the reflective surface of the record medium. Positioned at the conjugate image plane are means for measuring the diameter of the circular image of the circular spot wherein a first given diameter of the circular image of the circular spot is representative of the in-focus condition. Further, the apparatus includes means, responsive to the measuring means, for varying the position of the first projecting means to maintain the diameter of the circular image at the first given diameter such that the in-focus condition is effected. In the improved apparatus the lens imaging means includes a quasi-zoom lens arrangement.

In accordance with one aspect of the present invention, an apparatus for use in playback of a disc-shaped record medium having a spiral groove formed in a flat, reflective surface thereof is provided. The apparatus comprises means for illuminating a region of the grooved surface of the record medium wherein the illuminated region is sufficiently large to span a plurality of convolutions of the spiral groove. The illuminating means includes means for forming a beam of light directed toward the surface of the disc along an incident beam path and converging the light beam toward a point near the surface. Light detection means having a plurality of photosensitive regions are arranged on a flat plane. A light path optically couples the illuminated region and the flat plane and means are provided within the light path which acts on the light reflected from the illuminated region to image the illuminated region onto the flat plane as a circular area. Further, the apparatus includes means which are coupled to the photosensitive regions for measuring the diameter of the circular area wherein a first given diameter of the circular area is representative of an in-focus condition. Means which is responsive to the means for measuring the diameter of the circular image varies the position of the means for converging the light beam toward a point to maintain the diameter of the circular area at the first given diameter such that the in-focus condition is effected. In the improved apparatus the means acting on the light reflected from the illuminated region for imaging includes a quasi-zoom lens arrangement.

In accordance with another aspect of the present invention, a focus control apparatus for use with a disc-shaped record medium having information stored in a spiral groove formed on a flat, reflective surface of the record medium is provided. The apparatus comprises a second light source emitting a beam of light of a second given wavelength and a first light path optically coupling the second light source and the reflective surface of the record medium. The first light path includes means for focusing the light beam emitted by the second light source to a diffraction limited spot on the surface of the record medium. A second light detection means having a photosensitive surface is used to detect the information stored in the spiral groove. A second light path optically couples the focused light spot on the surface of the record medium to the photosensitive surface of the second light detection means. The apparatus further includes the first light souce emitting a beam of light of a first given wavelength and a third light path optically coupling the first light source and the reflective surface of the record medium. The third light path includes the means for focusing. The means for focusing converges the light beam emitted by the first light source such that it impinges on the reflective surface as a circular region having a diameter sufficiently large to span a plurality of groove convolutions of the spiral groove. The first light detection means having a plurality of photosensitive regions is arranged to measure the diameter of a conjugate image of the circular region which is incident on it. Further, the apparatus includes a fourth light path coupling the circular region on the reflective surface to the first light detection means which light path includes means for imaging the conjugate image of the circular region onto the first light detection means. The apparatus also includes means which is responsive to the first light detection means for generating a signal representative of the diameter of the conjugate image and means which is responsive to the signal generated by the generating means for varying the distance between the focusing lens and the reflective surface of the record medium to maintain the light beam emitted by the second light source in-focus on the reflective surface. In the improved apparatus the means for imaging a conjugate image of the circular region includes a quasi-zoom lens arrangement.

Other features and advantages of the invention will be more fully understood from the following detailed description of the preferred embodiment, the appended claims, and the accompanying drawing in which:

Figure 1:
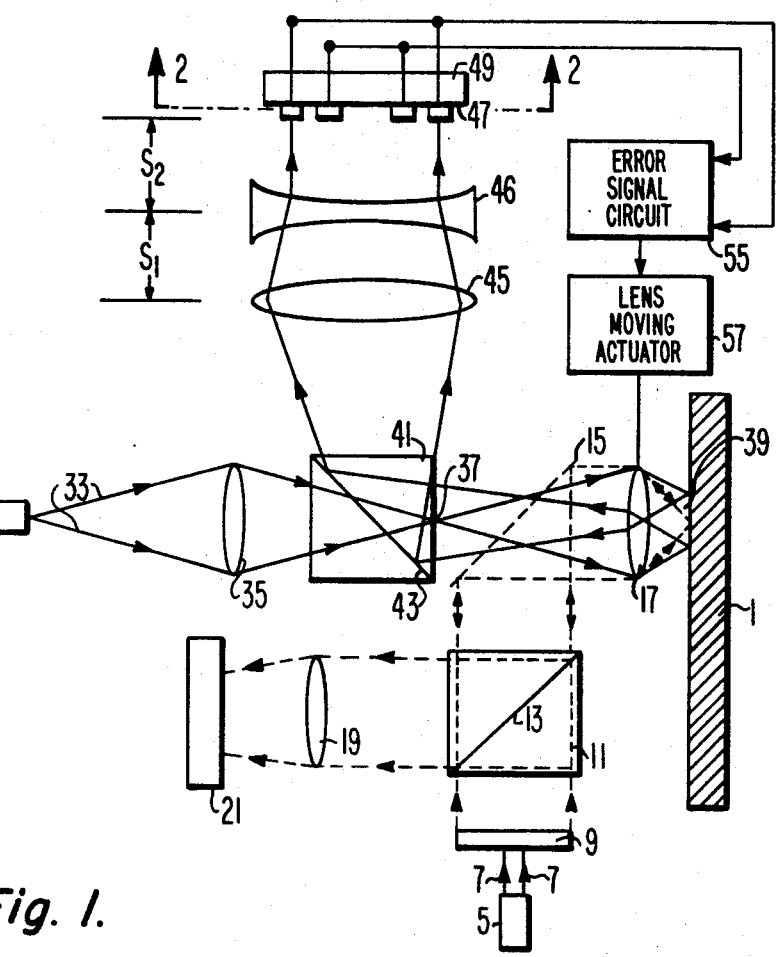
FIG. 1 is a schematic diagrasm of a light beam control and focusing arrangement of an optical disc player constructed in accordance with the principles of the present invention.

Referring to FIG. 1, in the apparatus shown a disc-shaped record carrier 1 is rotated by a motor (not shown). illustratively, record carrier 1 may be of a type described in U.S. Pat. No. 3,842,194 issued to J. K. Clemens. In certain high density information records, video information is recorded as relatively short (e.g., 0.6–1.6 micrometers) depth variations along the length of an information track. Illustratively, the method of recording may be of a type shown in U.S. Pat. No. 4,044,379 issued to J. B. Halter. Pursuant to the Halter method, an electro-mechanically driven stylus (e.g., of diamond) responsive to a combined video and audio signal records relatively short geometric variations representative of the time variations of the signal on a reflective surface of a metal substrate. After the electro-mechanical recording operation, the recorded surface of the metal substrate has a relief pattern corresponding to that which is desired in the final record. The apparatus of FIG. 1 provides a system for verifying the information cut on a metal master of a type described in the Clemens' patent prior to further processing operations.

A source of radiation 5 emits a beam of light bounded by rays 7. Illustratively, radiation source 5 may be a helium-neon laser emitting a beam of coherent light of generally circular contour at a wavelength of approximately 633 nanometers. The circular light beam emanating from light source 5 enters expanding telescope 9 and emerges with no change in shape but enlarged in cross section. This enlarged light beam enters the entrance face of beam splitter 11 which may include half silvered mirror 13. The enlarged light beam is transmitted by the exit face of beam splitter 11 unchanged in shape. This enlarged light beam impinges upon mirror 15 and is totally reflected toward a track of disc 1. Mirror 15 may be a dichroic mirror which transmits light of one wavelength and reflects light of another wavelength. Lens 17, interposed between mirror 15 and disc 1, receives the light beam and focuses the beam to form a diffraction limited spot on a track of disc 1.

The focused light beam is diffracted by the recorded data, appearing in the spiral track as a succession of depressed areas alternating along the length of the track with non-depressed area. The reflected light is collected by lens 17 and directed toward mirror 15. The light impinges onto mirror 15 and is reflected thereby toward beam splitter 11. The reflected light arrives at the beam splitter 11 and is reflected by the beam splitter in a direction orthogonal to the incident light path. This orthogonally reflected light is converged by lens 19 onto a light accepting region of light detector 21. Detector 21 which may be of a type illustrated in U.S. Pat. No. 4,065,786 issued to W. C. Stewart, converts the light energy reflected from the disc to electrical energy. The detector output signal will be a reproduction of the recorded data.

The apparatus according to FIG. 1 includes means for detecting whether the plane of record carrier 1 is in its desired position. A second source of radiation 31 provides a light beam bounded by rays 33. Illustratively, source of radiation 31 may be of a semiconductor laser type emitting a beam of coherent light of generally circular contour at a wavelength of approximately 820 nanometers. The light beam bounded by rays 33 emanating from source 31 enter lens 35 and is focused to a spot 37 which may represent an apparent source of radiation source 31. The light beam from source of radiation 31 enters the entrance face of beam splitter 41 and is transmitted by the exit face unchanged in shape. Beam splitter 41 may be comprised of half silvered mirror 43. Further, the light bram from light source 31 passes through dichroic mirror 15 which transmits light from source 31. Lens 17, interposed between mirror 15 and record carrier 1, receives the light beam from radiation source 31 and causes it to converge to form a light spot 39 of a generally circular contour having a diameter sufficiently large to span a plurality of convolutions of the spiral track formed on record medium 1 i.e., lens 17 focuses light from source 31 to a point beyond the surface. The reflected light from light spot 39 is collected by lens 17, passes through mirror 15 and impinges on beam splitter 41. The reflected light which arrives at beam splitter 41 is reflected by half silvered mirror 43 in a direction orthogonal to the incident light path. Lenses 45 and 46 image the surface of record carrier 1, i.e., the surface within light spot 39, onto surface 47 of support block 49. The circle of light incident on surface 47 illuminates a pair of photodetectors 51 completely. When lens 17 is properly located so that the light beam from source of radiation 5 is incident on disc 1 as a diffraction limited spot the light beam from the source of radiation 31 is incident on the disc surface as a circle of confusion. In practice light spot 39 is imaged to surface 47 such that its image illuminates approximately one-half of the photosensitive surface of detectors 53.

Figure 2:
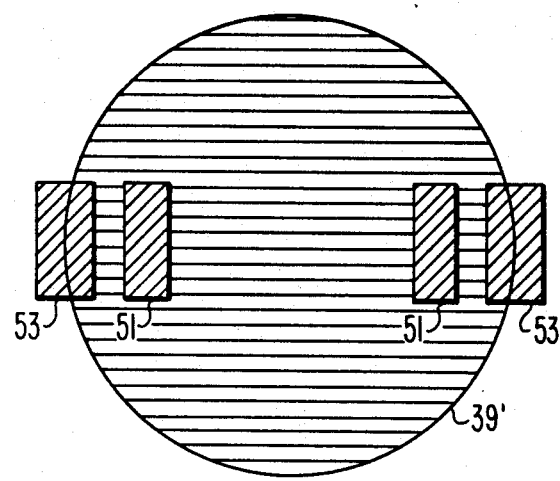
FIG. 2 is a sectional view as taken through arrows 2—2 of FIG. 1.
Figure 3:
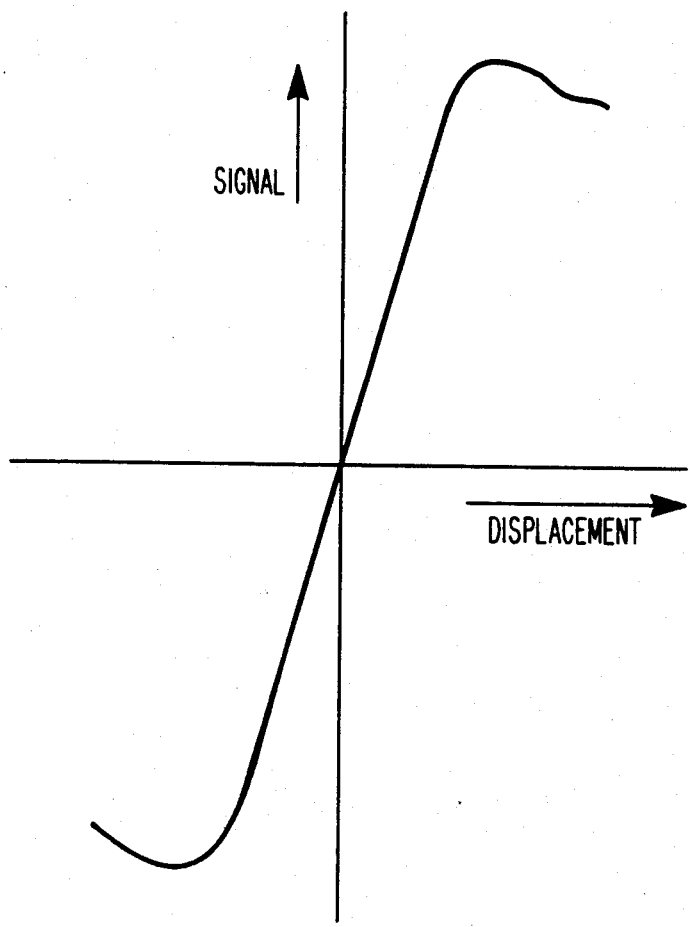
FIG. 3 is a waveform illustrating various characteristics of the transducer and error signal circuit shown in FIG. 1.

Referring to FIG. 2 a sectional view taken at the surface of support 49 shows light spot 39', which represents an image of light spot 39, completely illuminating inner photodetectors 51 while illuminating approximately one-half of outer photodetectors 53. By taking approximately one-half of the sum of the output signals from detectors 51 and subtracting the sum of the output signals from detectors 53 a null is obtained when the light beam from radiation source 5 is in-focus on record carrier 1 (i.e., a measure of the diameter of light spot 39' and thus of light spot 39). When the output from detectors 53 decreases which indicates that the light from source of radiation 5 is focused above record carrier 1 the difference output of the error signal will be greater than zero. While if the output from detectors 53 is greater than the attenuated output from detectors 51 which indicates that the light from source of radiation 5 is inside of focus, the difference signal will be less than zero. FIG. 3 is representative of the error signal from circuit 55 versus displacement of lens 17 in accordance with the aforementioned summing technique.

In order to ensure that the focus error signal is unaffected by the groove tracking error, disc reflectivity variations or groove modulation the diameter of landing spot 39 on the disc surface is adjusted such that it is large enough to span a plurality of grooves. For example, for the case where the groove spacing is 2.5 $\mu$m, the landing spot 39 may be provided with a diameter of 100 $\mu$m, thus spanning approximately forty grooves, the detectors actually receiving light from ten grooves. It will be appreciated that when landing spot 39 on the surface of disc 1 is relatively large, when compared to the size of the landing spot for the read beam, the reflected light beam is simultaneously influenced by a plurality of adjacent grooves so that the modulation of the reflected light by surface undulations or reflectivity variations is averaged to eliminate or substantially minimize the overall modulation of the reflected light beam as received by detectors 51 and 53.

In the aforementioned Jebens application, the imaging lens system provided between beam splitter 41 and support 49 includes a single converging lens. Lenses 45 and 46 of FIG. 1 form a quasi-zoom telephoto system whose effective focal length can be changed by moving lens 46 to change the separation $S_1$ between lenses 45 and 46. For some combination of parameters the distance $S_1$ plus $S_2$ remains constant without degrading the focus of light spot 39' at the detectors 51 and 53, thus permitting movement of lens 46 to vary the size of light spot 39' without relocating the position of the detectors.

A true zoom lens arrangement generally contains at least three optical elements, two of which are moveable, and provides variation of the focal length without changing the sharpness of the image over comparatively large distances. Lenses 45 and 46 provide a quasi-zoom arrangement of only two optical elements, only one being moveable, that provides effective focal length variation within the limits of degradation acceptable in this apparatus, i.e., over focus variations of a few millimeters. By using a quasi-zoom arrangement, such as lens combination 45 and 46, the optical and mechanical complexity of a true zoom lens is eliminated thus reducing the cost and improving performance (i.e., fewer optical surfaces).

In the Jebens system lens 17 has a 2.5 mm focal length and the effective focal length of the lens system which images circular spot 39 onto the detector is 250 mm, providing a magnification of 100 from the disc to the detectors. One lens combination having the properties discussed above includes a 150 mm focal length lens for converging lens 45 and a $-100$ mm focal length for diverging lens 46 where the distance $S_1$ plus $S_2$ is 177 mm. This lens combination provides an effective focal length of 250 mm. It will be appreciated that the overall length of 177 mm is substantially shorter than the 250 mm of the Jebens system.

Moving lens 46 by plus or minus 5 mm provides a magnification variation of 109 to 92 when used in the above-mentioned lens combination. That magnification variation permits a variation of plus or minus 2 $\mu$m in the location of the surface of disc 1. The significant result is that variations of plus or minus 5 mm in the location of lens 46 provides an adjustment of plus or minus 2 $\mu$m focus variation.

In the illustrative embodiment of FIG. 1 the output from detectors 51 and 53 are coupled to error signal circuit 55 for processing in accordance with the aforementioned description. The error signal which may be represented by the curve of FIG. 3 is fed into a lens moving actuator 57 for repositioning lens 17 to maintain the light beam emitted by the source of radiation 5 focused on the record carrier 1. The actuator drive and actuator for the lens as represented by block 57 may be of a type described in U.S. Pat. No. 4,183,060, issued to W. E. Barnette.

The present invention provides a novel focus arrangement for maintaining constant the distance between an objective lens and a disc surface. It will be appreciated by those of skill in the art that a stop may be positioned in the center of the focus control light beam, for example, at the center of lens 35 of FIG. 1, to reduce the effect of the background noise from radiation source 31 on the output of detector 21.

While the principles of the present invention have been demonstrated with particular regard to the illustrated structure of the FIGURES, it will be recognized that various departures from such illustrative structure may be undertaken in practice of the invention. For example, the focus apparatus may be used in conjunction with a recording system as well as a playback system as described herein. Further, the invention may also be applied to record carriers other than disc-shaped, for example, tape-shaped record carriers, in which the structure which represents the information lies in a substantially flat surface structure. Also the invention may be applied to non-recording/playback systems, e.g., automatic focus for microscopes, slide projectors, etc.

What is claimed is:

1. In an information retrieval system for use in playback of a record medium having information stored along successive, elongated tracks on a flat, reflective surface thereof, said system having a first light source emitting a light beam of a given wavelength; first means for projecting said light beam emitted by said first light source to impinge on said reflective surface of said record medium as a circular spot having a diameter sufficiently large to span a plurality of said elongated tracks; second means for imaging said circular spot to a conjugate circular image at a plane remote from said reflective surface of said record medium; means, positioned at said conjugate image plane, for measuring the diameter of said circular image ofsaid circular spot; a first given diameter of said circular image of said circular spot, being representative of an in-focus condition; and means, responsive to said measuring means, for varying the position of said first projecting means to maintain the diameter of siad circular image at said first given diameter such that said in-focus condition is effected; the improvement comprising: said second means for imaging including a quasi-zoom lens arrangement, said quasi-zoom lens arrangement including first and second lenses forming a telephoto lens system whereby the diameter of said conjugate circular image at said remote plane is varied, without degrading the focus condition at said remote plane, when the position of said second lens is adjusted.

2. In an information retrieval system for use in playback of a disc shaped record medium having a spiral groove formed in a flat, reflective surface thereof, said system having means for illuminating a region of the grooved surface of said record medium, the illuminated region being sufficiently large to span a plurality of convolutions of said spiral groove, said illuminating means including means for forming a beam of light directed toward said surface along an incident beam path and converging said light beam toward a point near said surface; light detection means having a plurality of photosensitive regions arranged on a flat plane; a light path optically coupling said illuminated region and said flat plane; means acting on the light reflected from said illuminated region within said light path for imaging said illuminated region onto said flat plane as a circular area; means, coupled to said photosensitive regions, for measuring the diameter of said circular area, a first given diameter of said circular area being representative of an in-focus condition and means, responsive to said means for measuring the diameter of said circular image, for varying the position of said means for converging said light beam toward a point to maintain the diameter of said circular area at said first given diameter such that said in-focus condition is effected; the improvement comprising: said means acting on the light reflected from said illuminated region for imaging including a quasi-zoom lens arrangement, said quasi-zoom lens arrangement including first and second lenses forming a telephoto lens system whereby the diameter of said conjugate circular image at said remote plane is varied, without degrading the focus condition at said remote plane, when the position of said second lens is adjusted.

3. A focus control apparatus for use with a disc shaped record medium having information stored in a spiral groove formed on a flat, reflective surface thereof, the apparatus having: a first light source emitting a beam of light of a first given wavelength; a first light path optically coupling said first light source and said reflective surface of said record medium, said first light path including means for focusing said light beam emitted by said first light source to a diffraction limited spot on said surface of said record medium; first light detecting means having a photosensitive surface, said light detection means being used to detect said information stored in said spiral groove; a second light path optically coupling said focused light spot on said surface of said record medium to said photosensitive surface of said first light detection means, a second light source emitting a beam of light of a second given wavelength; a third light path optically coupling said second light source and said reflective surface of said record medium, said third light path including said means for focusing, said light beam emitted by said second light source being projected by said means for focusing to impinge on said reflective surface as a circular region having a diameter sufficiently large to span a plurality of groove convolutions of said spiral groove; second light detection means having a plurality of photosensitive regions arranged to measure the diameter of a conjugate image of said circular region incident on said second light detection means; a fourth light path coupling said circular region on said reflective surface to said second light detection means and including means for imaging said conjugate image of said circular region onto said second light detection means; means responsive to said second light detection means, for generating a signal representative of the diameter of said conjugate image; and means, responsive to said signal generated by said generating means, for varying the distance between said focusing lens and said reflective surface of said record medium to maintain said light beam emitted by said first source in-focus on said reflective surface; the improvement comprising: said means for imaging a conjugate image including a quasi-zoom lens arrangement, said quasi-zoom lens arrangement including first and second lenses forming a telephoto lens system whereby the diameter of said conjugate circular image at said remote plane is varied, without degrading the focus condition at said remote plane, when the position of said second lens is adjusted.

4. The system according to claims 1, 2 or 3 wherein said first lens includes a convergent lens and said second lens includes a divergent lens.

5. The system according to claim 4 wherein said convergent lens has a focal length of 150 mm and said divergent lens has a focal length of $-100$ mm.

* * * * *

UNITED STATES PATENT AND TRADEMARK OFFICE
CERTIFICATE OF CORRECTION

PATENT NO. : 4,376,303
DATED : March 8, 1983
INVENTOR(S) : Michael Jay Lurie

It is certified that error appears in the above-identified patent and that said Letters Patent is hereby corrected as shown below:

Col. 3, line 25 "souce" should be -- source --.

Col. 3, line 58 "diagrasm" should be -- diagram --.

Col. 4, line 41 "area" should be -- areas --.

Col. 4, line 70 "bram" should be -- beam --.

Col. 7, line 22 "ofsaid" should be -- of said --.

Signed and Sealed this

Twenty-sixth Day of April 1983

[SEAL]

Attest:

Attesting Officer

GERALD J. MOSSINGHOFF

Commissioner of Patents and Trademarks